(12) United States Patent
Baker

(10) Patent No.: US 7,953,016 B2
(45) Date of Patent: May 31, 2011

(54) METHOD AND SYSTEM FOR TELECOMMUNICATION APPARATUS FAST FAULT NOTIFICATION

(75) Inventor: Brian N. Baker, Dunrobin (CA)

(73) Assignee: Nortel Networks Limited, Mississauga, Ontario (CA)

( * ) Notice: Subject to any disclaimer, the term of this patent is extended or adjusted under 35 U.S.C. 154(b) by 385 days.

(21) Appl. No.: 12/041,057

(22) Filed: Mar. 3, 2008

(65) Prior Publication Data

US 2009/0222687 A1    Sep. 3, 2009

(51) Int. Cl.
H04L 1/00 (2006.01)
H04L 12/26 (2006.01)

(52) U.S. Cl. ........ 370/242; 370/248; 370/216; 370/217; 370/219; 370/220; 370/221; 370/225

(58) Field of Classification Search ................... 370/254, 370/255, 216–221, 242, 248; 714/55, 43, 714/712, 48, 47, 4
See application file for complete search history.

(56) References Cited

U.S. PATENT DOCUMENTS

| | | | |
|---|---|---|---|
| 6,545,981 B1 * | 4/2003 | Garcia et al. ................. | 370/242 |
| 6,999,409 B2 * | 2/2006 | Oyamada ..................... | 370/218 |
| 7,257,746 B2 * | 8/2007 | Schirdewahn ................ | 714/712 |
| 7,370,239 B2 * | 5/2008 | Apel et al. ....................... | 714/43 |
| 7,564,778 B2 * | 7/2009 | Soumiya et al. ............... | 370/221 |
| 7,602,726 B1 * | 10/2009 | Sundaresan et al. .......... | 370/237 |
| 7,689,875 B2 * | 3/2010 | Cahill et al. ..................... | 714/55 |
| 7,706,259 B2 * | 4/2010 | Kim et al. ..................... | 370/228 |
| 7,852,752 B2 * | 12/2010 | Kano ............................ | 370/221 |
| 7,864,665 B2 * | 1/2011 | Shei et al. ..................... | 370/216 |
| 7,869,373 B2 * | 1/2011 | Lundstrom et al. ........... | 370/242 |
| 2003/0031125 A1 * | 2/2003 | Oyamada ...................... | 370/218 |
| 2005/0111350 A1 * | 5/2005 | Kano ............................ | 370/216 |
| 2005/0249123 A1 * | 11/2005 | Finn ............................. | 370/242 |
| 2006/0245350 A1 * | 11/2006 | Shei et al. ..................... | 370/216 |
| 2007/0053283 A1 * | 3/2007 | Bidwell et al. ................ | 370/216 |
| 2008/0002569 A1 * | 1/2008 | Cole et al. ..................... | 370/216 |
| 2008/0209286 A1 * | 8/2008 | Hamada ........................ | 714/724 |
| 2009/0003195 A1 * | 1/2009 | Pitchforth, Jr. ................ | 370/218 |
| 2009/0109843 A1 * | 4/2009 | Yang ............................. | 370/225 |
| 2009/0201799 A1 * | 8/2009 | Lundstrom et al. ........... | 370/217 |

* cited by examiner

*Primary Examiner* — Ayaz R Sheikh
*Assistant Examiner* — Chuong T Ho
(74) *Attorney, Agent, or Firm* — Christopher & Weisberg, P.A.

(57) ABSTRACT

A method and system for containing a fault in a network node. A loss of all remaining communication links from a node is detected. A time duration from the loss of a first remaining communication link to the loss of a last remaining communication link is determined. It is established that the node has contained a fault when the time duration for the loss of the first remaining communication link to the loss of the last remaining communication link is not more than a predetermined amount of time.

15 Claims, 3 Drawing Sheets

METHOD AND SYSTEM FOR TELECOMMUNICATION APPARATUS FAST FAULT NOTIFICATION

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to network communications and in particular to a method and system for identifying and responding to faults in network devices.

BACKGROUND OF THE INVENTION

Telecommunication system providers are driven by user demands for extremely reliable systems that experience little down time and that can take automatic corrective action without the need for human intervention. The time required to take corrective action for a system fault is typically much longer when a human is involved than when a fault is determined and automatically responded to by the system itself. In fact, faults may not even be readily observable by a human operator and can range, for example, from a system component or device element that actually stops working or produces a processor interrupt to something so minor that it is hard to even ascertain that anything is wrong. Among the latter there is an even more difficult subset where the device appears to be operating, but it is not operating correctly.

For example, consider the case where a processor starts incorrectly adding at some frequency larger than zero. Now assume that a message or packet is built by the processor. The processor does this by inserting a message code and associated data into the packet by adding an offset to a logical pointer from the start of the message packet and writing the desired data there. The incorrect addition by the processor causes an unapparent and hard to detect fault. Instead of writing the message data structure by writing it at the message plus the offset for the message code, the structure goes somewhere else causing some other structure to be corrupted and the receiver to get the value that was previously in the location rather than that intended to be written. An alternative fault could write the correct address but the wrong value into the message packet. If the message that was supposed to be sent out was to do something like report a system fault, it is not the correct and intended message that is sent. Depending on where the data was sent and what was actually sent, the results can vary from simply dropping a communication session, e.g., a call, to resetting the entire system. As such, one can not depend on the processor to simply know that a fault has occurred and remedy the situation by not sending the message. Further, even if the processor is aware of the problem, the rest of the system needs to be quickly notified so that back-up hardware can be activated.

When a fault occurs, it is desirable that the fault be contained within the malfunctioning device as quickly as possible to prevent "contamination" of other devices within the system. It is further desirable that the fault be repaired without breaking this containment. For example, a telecommunication device such as a blade-based switch may experience a failure in which it continuously transmits data packets to remote devices, thereby consuming network transmission resources, i.e., link resources, and consumes processing resources at the switch at the other end of the link or at the final destination of the message. In this case, it is desirable to contain the fault to the malfunctioning node and discontinue transmission to the destination node as quickly as possible to prevent causing that destination node to fail due to overloading or receiving incorrect messages.

It is certainly desirable for a system to recover from a fault as quickly as possible in order to restore service. Toward that end, recovery can be accomplished by replacing the function of the faulted element using an operational element. Such replacement should not violate the containment of the fault else the integrity of the system is unduly put at risk. As such, the architecture of the system should provide a way to quickly determine the presence of the fault without violating the containment. For example, merely sending a message to an external device to notify the system of the fault is not appropriate because it violates the desirability for fault containment and could actually spread the failure condition from the faulty node to the rest of the system. It is therefore also desirable to be able to notify other system elements in a manner that does not adversely impact fault containment so that a back-up blade server can be activated.

In other words, demands on system operators and equipment designers, especially in the telecommunications equipment industry where compliance with the Advanced Telecommunications Computing Architecture ("ATCA") can constrain designers means that the system has to immediately find out that an element has failed, but the element cannot transmit anything due to the risk that such transmission may take the system down. However, current ATCA devices can take three to nine seconds for a fault to be reported from the failed board to the system after the fault has been detected on the card. This delay can add an average of six seconds to the recovery per board failure. It is therefore a general desire that the system architecture provide some method to firewall the fault and to provide a notification method that does not violate the firewalls.

An example of a system designed to do this is one that implemented an interface on the communication links that was based on a protocol that used idle codes between messages and a start of message code followed by the format of the message and then returning to idle after the message is complete. The protocol was modified to include two idle codes, namely codes for a normal idle and a fault idle. The interface chip had a special input pin that was connected to the circuit board fault detection tree so that it was active when no fault was detected and inactive when there was a fault. When this input was active the idle code was the normal code, the interface chip would accept new messages but when the signal was inactive the messages in progress would halt and it would return to a fault idle code being generated. The rest of the system had detectors looking for fault idle codes and two states for each link. Each state was associated with a set of operating characteristics and they were programmed so that essentially in a faulty state everything was blocked and in a correct state everything subject to normal routing and permission states was allowed.

When a fault idle was detected on the link, the state machine changed to fault mode and the links were shut down. Only system maintenance software could change the state back to normal mode and bring the element back into service once any fault was detected. This arrangement also required extensive fault detection capability on each element and the two things together provided the detection which fed into the detection tree and triggered a signal to the rest of the system without any violation of the containment. While workable, such an arrangement is expensive and requires the use of customized hardware. With a push toward building reliable communication systems out of stock hardware, the above-mentioned solution is not desirable.

It is desirable to have a system and method that contains faults within an element in a manner that is reliable, provides quick system notification and that allows for rapid resolution of the failure through, for example, the activation of a back-up element.

SUMMARY OF THE INVENTION

The present invention advantageously provides a method and system for identifying and isolating faults in a network device, such as a communication network device that complies with ATCA standards. The system and method are provided such that the fault isolation and recovery can be implemented using existing hardware.

In accordance with one aspect, the present invention provides a method for identifying a faulting element in a network, such as a fault in a network node. A loss of all remaining communication links from the node is detected. A time duration from the loss of a first remaining communication link to the loss of a last remaining communication link is determined. It is established that the node has contained a fault when the time duration for the loss of the first remaining communication link to the loss of the last remaining communication link is not more than a predetermined amount of time.

In accordance with another aspect, the present invention provides a system having fast fault identification and recovery in which the system has a node and at least one data communication device in communication with the node through a corresponding communication link. The node has a node processor and at least one node communication module in operative communication with the node processor. Each data communication device has a data communication device communication interface and a data communication device processor in operative communication with the communication device communication interface. The communication device processor detects a loss of all remaining communication links from the node, determines a time duration from the loss of a first remaining communication link to the loss of a last remaining communication link and establishes that the node has contained a fault when the time duration for the loss of the first communication link to the loss of the last communication link is not more than a predetermined amount of time.

In accordance with yet another aspect, the present invention provides a method for isolating network communication device faults in a device having at least one currently operating network communication interface in which a fault is detected within the network communication device. The fault is isolated by disabling all of the at least one currently operating network communication interfaces at substantially a same time.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
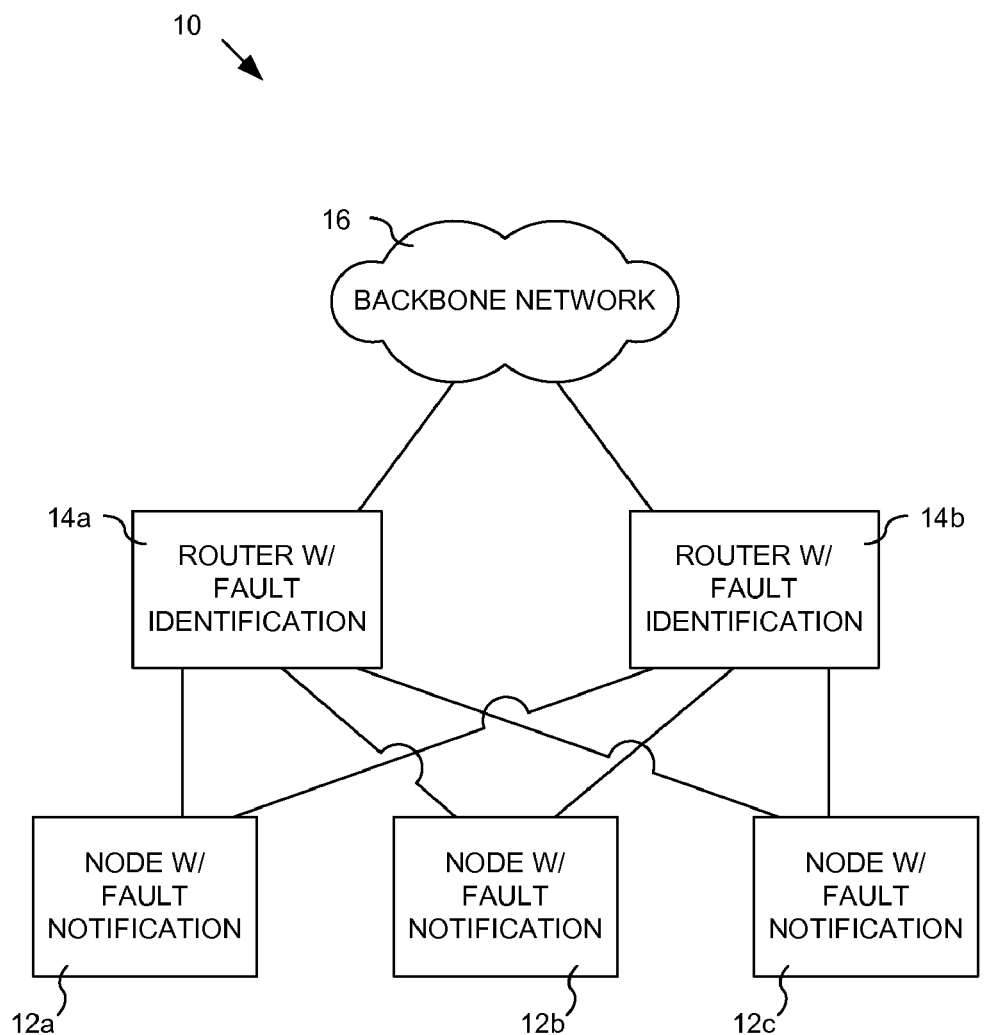
FIG. 1 is a diagram of a system constructed in accordance with the principles of the present invention.

Referring now to the drawing figures in which like reference designators refer to like elements, there is shown in FIG. 1, a system constructed in accordance with the principles of the present invention and designated generally as "10". Communication system 10 preferably includes one or more network elements such as nodes 12a, 12b and 12c (referred to collectively herein as "nodes 12") engaged in data communication via communication links to one or more other network elements, such as routers 14a and 14b (referred to collectively herein as routers 14). Of note, although the present invention is explained with reference to routing devices, it is understood that the present invention is not limited to such. It is contemplated that any switching or processing device that can perform the inventive functions described herein can be used in place of routers.

Routers 14 are coupled to backbone network 16 for communication to other network elements such as other remote routers (not shown) via backbone communication links. It is also contemplated that routers 14a and 14b can be directly coupled together via a local data communication link (not shown). The protocol for communication among and between nodes 12, routers 14 and backbone network 16 can be any suitable data communication protocol as may be known, including but not limited to the transmission control protocol/internet protocol ("TCP/IP").

Although FIG. 1 shows nodes 12 coupled to routers 14 in a "dual star" topology, such depiction and the corresponding description made herein is merely exemplary. It is contemplated that other network topologies can be equally suitable, depending on the implementation desired by system designers. For example, nodes 12 can be connected to one another in a mesh or partial mesh topology without use of routers 14. As such, it is understood that the functions described herein with reference to routers 14 can be implemented and performed by other peer nodes 12. Accordingly, the present invention, although described with reference to routers 14, is not limited to implementations that must include one or more routers 14. Toward that end, peer nodes 12 and routers 14 are generally referred to herein as communication devices.

Nodes 12 and routers 14 may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. The physical arrangement of hardware for nodes 12 and/or routers 14 can comply with the ATCA. Although not shown in FIG. 2, it is contemplated that nodes 12 implemented in accordance with ATCA standards are blade boards inserted into a common chassis, in which the chassis also includes a separate system board that monitors the nodes 12 and a power supply to power nodes 12.

Furthermore, the computer readable medium may comprise computer readable information in a transitory state medium such as a network link and/or a network interface, including a wired network or a wireless network that allows a computer system to read such computer readable information.

Figure 2:
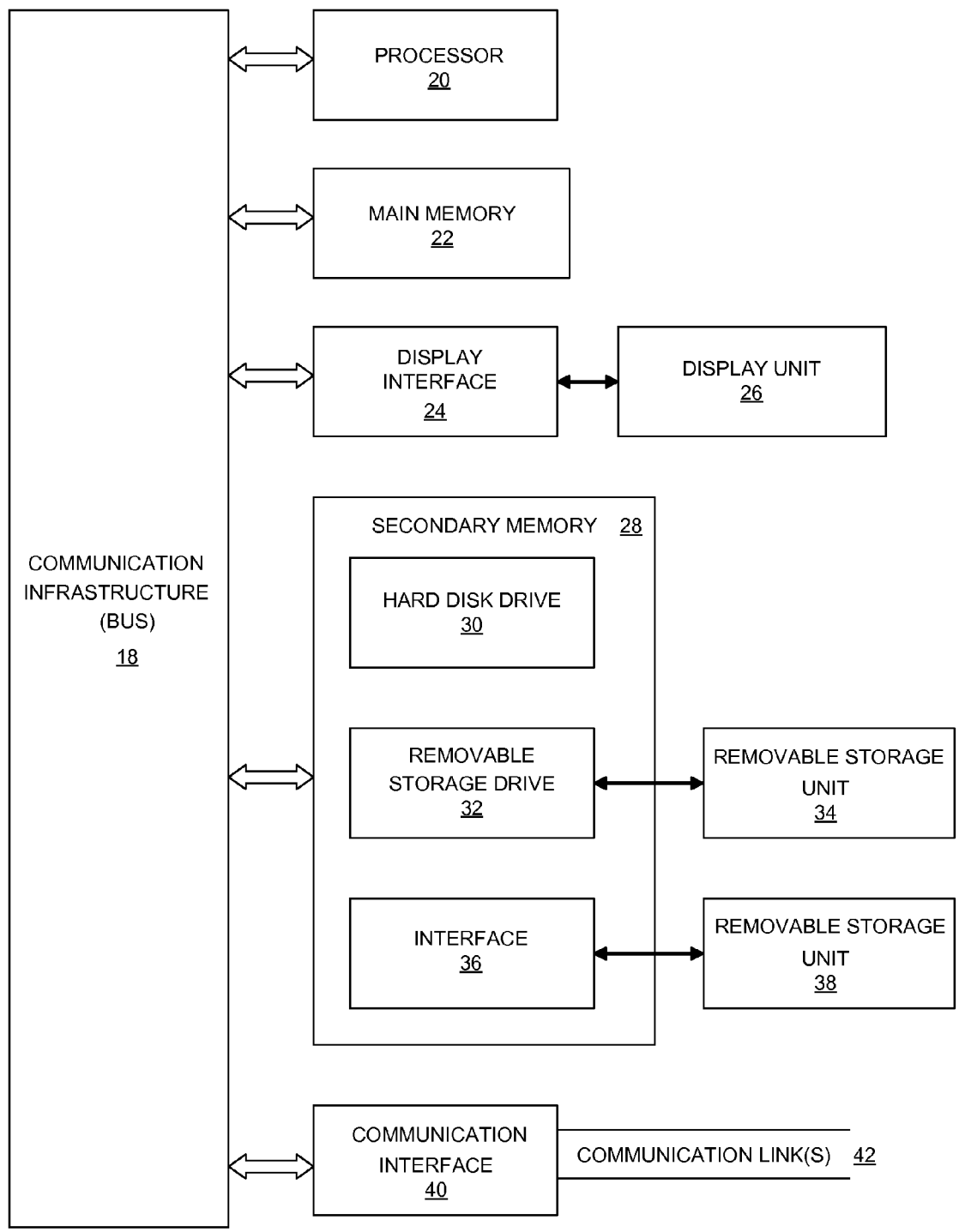
FIG. 2 is a block diagram of exemplary nodes and/or routers constructed in accordance with the principles of the present invention.

FIG. 2 is a block diagram of nodes 12 and/or routers 14 useful for implementing an embodiment of the present invention. Of note, although the term "router" is used herein, it is understood that "router" is used broadly herein to include switches and other data communication devices that receive data on one or more interfaces and output data on one or more interfaces based on a switching/routing decision engine. It is also understood that, while the general hardware elements of nodes 12 and routers 14 are shown as being the same, the physical devices themselves need not be identical. For example, the programmatic software code in nodes 12 and routers 14 will likely differ as likely will the actual sizes and capacities of the below described elements. For example, it is contemplated that nodes 12 can be blade boards for performing telecommunication service switching functions installed in a common ATCA-compliant chassis, while routers 14 can be larger stand-alone devices.

Referring to FIG. 2, nodes 12 and routers 14 in an exemplary system 10 include one or more processors, such as processor 20. The processor 20 is connected to a communication infrastructure 18, e.g., a communications bus, crossbar interconnect, network, etc. Various software embodiments are described in terms of this exemplary computer system. After reading this description, it will become apparent to a person of ordinary skill in the relevant art(s) how to implement the invention using other computer systems and/or computer architectures.

Nodes 12 and routers 14 can optionally include or share a display interface 24 that forwards graphics, text, and other data from the communication infrastructure 18 (or from a frame buffer not shown) for display on the display unit 26. The computer system also includes a main memory 22, preferably random access memory ("RAM"), and may also include a secondary memory 28. The secondary memory 28 may include, for example, a hard disk drive 30 and/or a removable storage drive 32, representing a floppy disk drive, a magnetic tape drive, an optical disk drive, etc. The removable storage drive 32 reads from and/or writes to a removable storage unit 34 in a manner well known to those having ordinary skill in the art. Removable storage unit 34, represents, for example, a floppy disk, magnetic tape, optical disk, etc. which is read by and written to by removable storage drive 32. As will be appreciated, the removable storage unit 34 includes a computer usable storage medium having stored therein computer software and/or data.

In alternative embodiments, the secondary memory 28 may include other similar means for allowing computer programs or other instructions to be loaded into the computer system. Such means may include, for example, a removable storage unit 38 and an interface 36. Examples of such may include a program cartridge and cartridge interface (such as that found in video game devices), a removable memory chip (such as an EPROM, EEPROM or PROM) and associated socket, and other removable storage units 38 and interfaces 36 which allow software and data to be transferred from the removable storage unit 38 to the nodes 12 and/or routers 14.

Nodes 12 and routers 14 may also include a communications interface 40 (also referred to herein as a communication "module" to aid understanding and distinction between nodes 12 and routers 14). Communications interface/module 40 allows software and data to be transferred between the node 12 or router 14 and external devices. Examples of communications interface/module 40 may include a modem, a network interface (such as an Ethernet card), a communications port, a PCMCIA slot and card, etc. Software and data transferred via communications interface/module 40 are in the form of signals which may be, for example, electronic, electromagnetic, optical, or other signals capable of being received by communications interface 40. These signals are provided to communications interface/module 40 via the communications link (i.e., channel) 42. This channel 42 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 22 and secondary memory 28, removable storage drive 32, a hard disk installed in hard disk drive 30, and signals. These computer program products are means for providing software to the node 12 or router 14. The computer readable medium allows the computer system to read data, instructions, messages or message packets, and other computer readable information from the computer readable medium. The computer readable medium, for example, may include non-volatile memory, such as floppy, ROM, flash memory, disk drive memory, CD-ROM, and other permanent storage. It is useful, for example, for transporting information, such as data and computer instructions, between other devices within system 10. Furthermore, the computer readable medium may comprise computer readable information in a transitory state medium such as a network link and/or a network interface, including a wired network or a wireless network that allows a computer to read such computer readable information.

Computer programs (also called computer control logic) are stored in main memory 22 and/or secondary memory 28. Computer programs may also be received via communications interface 40. Such computer programs, when executed, enable the node 12 or router 14 to perform the features of the present invention as discussed herein. In particular, the computer programs, when executed, enable the processor 20 to perform the features of the corresponding node 12 or router 14. Accordingly, such computer programs represent controllers of the corresponding device.

The present invention provides an arrangement by which nodes 12 can identify a fault and quickly notify other system elements, such as routers 14 to facilitate recovery such as by the activation of a backup node. Such notification is provided by nodes 12 through the disablement of all external links from the faulty node 12. For example, in the case where node 12a determines that one of its elements has failed; node 12a would disable communication links to routers 14a and 14b.

In accordance with the present invention, routers 14 include programmatic software that identifies that links from nodes 12 have failed and, upon determining that all remaining links from a given node 12 have failed within a predetermined time, conclude that the corresponding node 12 has incurred and isolated, i.e., contained, a fault. Router 14 can then initiate recovery procedures to, for example, activate a backup node 12. Referring to FIG. 1, in the case where node 12a has an internal fault and provides notification of containment by disabling remaining communication links to routers 14a and 14b, router 14a and/or 14b can communicate with the other to establish that both links (or that the last link) from node 12a have failed within a predetermined time of one another to therefore conclude that node 12a has had and has contained a fault.

Figure 3:
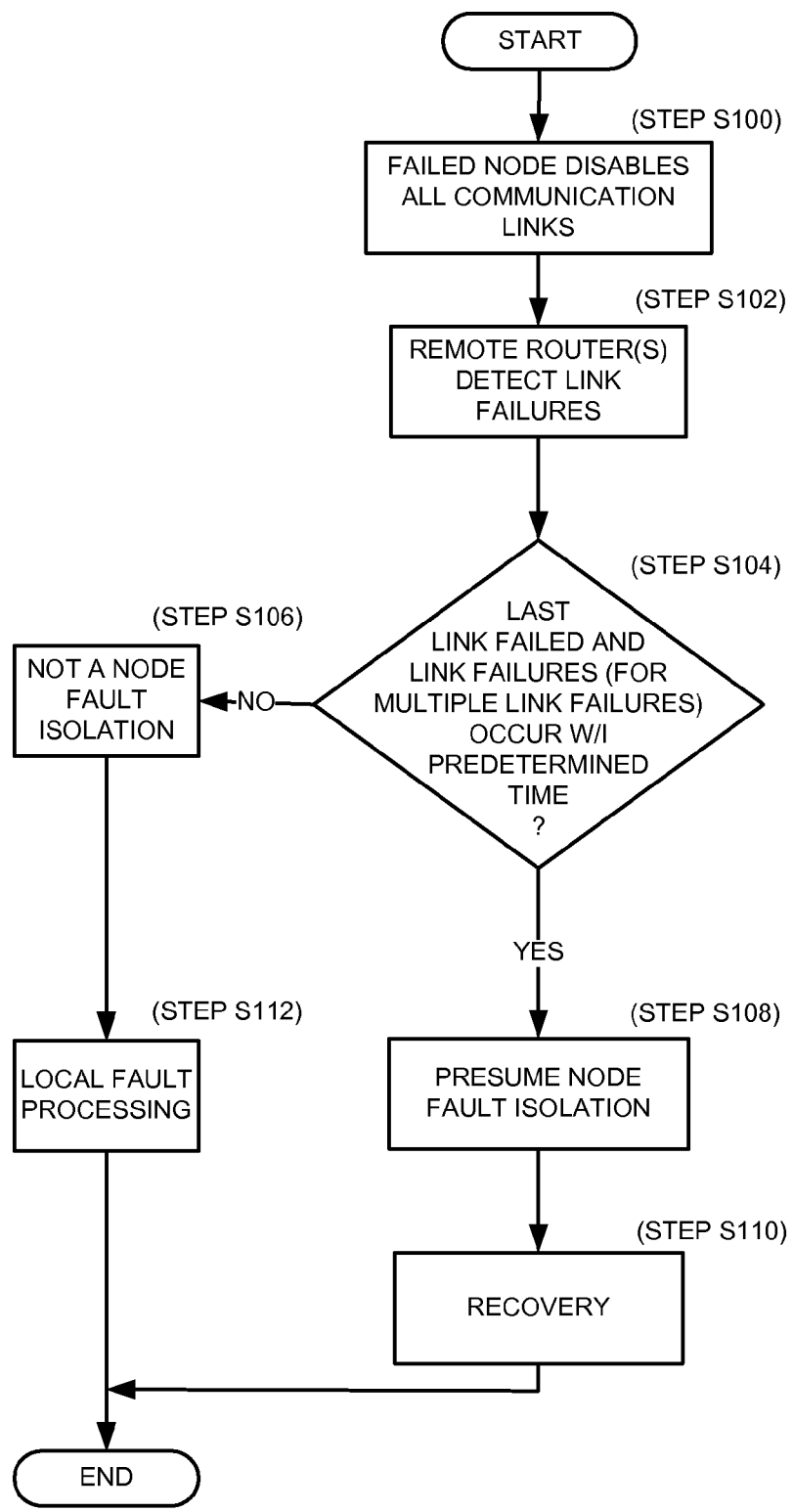
FIG. 3 is a flow chart of a fault recovery process performed in accordance with the principles of the present invention.

An exemplary fault notification and identification process for the present invention is explained in detail with reference to FIGS. 1 and 3. When a node 12 determines that an element within that node has failed or is not operating properly, the malfunctioning node 12 disables all remaining communication links there from (step S100). Such disablement can include (1) instructing the node communication interface 40 to disable at least the interface driver to allow the far end to detect a failure on the link typically by detecting the loss of the carrier detect or detecting a loss of clock, or (2) any other method to detect the failure from each communication link. In other words, by disabling the drivers, routers 14 can monitor the carrier detect and loss of clock signals and determine that the link has been lost.

It is noted that fault within a node 12 is not necessarily relegated solely to the failure of a physical component or element within node 12, but rather can include the detection that software within node 12 has malfunctioned, such as may be the case when there is a power loss, programmatic software bug, etc. Such detection can be made, for example, by including a watchdog timer within the programmatic software code that is periodically reset when node 12 and its software are operating normally. If the watchdog timer expires, thereby indicating a malfunction in either the hardware or software, the expiration can cause an interrupt within the node processor 20 indicating a fault condition that leads to containment and shutting the links down or some other mechanism to force a reset of node 12. As a result of the reset, the communication links emanating from that node 12 will fail, at least for the period of time that it takes the node 12 to reset itself and resume normal operation. In this case, routers 14 will still observe the failure of the communication links from node 12.

As noted above, remote routers 14 detect the loss of communication links from the failed node 12 (step S102). In accordance with the present invention, failure of the communication links need not be determined based on the receipt of any information or data packet indicating failure. Rather, failure of communication links is advantageously detected by monitoring the communication links for traditional outage such as would be determined through loss of carrier, loss of a clock signal, etc.

Routers 14 communicate with one another to determine whether they have detected failures of the remaining links of node 12 (where there are multiple remaining links) within a predetermined time and that the last remaining link from a node 12 has failed (step S104). In other words, with respect to the timing based failure analysis, there is a determination made as to whether the time duration from the loss of the first remaining communication link, e.g., the link from node 12a to router 14a, to the loss of the last remaining communication link, e.g., the communication link from node 12a to router 14b occurs within a predetermined time period. If it is determined that the communication link failures for the remaining links did not occur within a predetermined period of time or that the link failure is not the last link from the node 12, it is presumed that the failure of the communication links is for reasons other than a node fault containment (step S106). As such, in all cases, recovery is initiated when all links fail because loss of all links is a loss of service indicating potential node failure and the reason can be determined after recovery. With respect to the timing-based failure analysis, if it is determined that the first and last remaining communication link failure occurrences are within a predetermined time period, it is determined that there has been a containment due to some fault (step S108), for example a failure or other now contained fault problem within node 12, and recovery procedures are initiated (step S110).

In the case where it is presumed that the fault is for something other than node fault containment (see step S106), a local fault identification process can be initiated (step S112). For example, where no conclusion is reached in step S 104 that the link failures are due to node fault isolation, assuming that the failure of a link has still caused a traffic shift to another link, correction may be required and some maintenance may need to be performed to determine if and how the failed link can be recovered.

Of note, the terms "first" and "last" when referring herein to remaining communication link failure is event-based and does not mean that the failure of all links from a node must be detected within the predetermined period. For example, a link from node 12 may have previously failed for reasons other than as part of failure containment. As such, a subsequent failure event that would trigger fault containment in accordance with the present invention would lead to that node 12 disabling the remaining links within the predetermined time period. In other words, the measurement period to determine the fault isolation condition is based on then-active links at the time of the fault condition triggering event with the "first" link failure being the initially detected failure of the first remaining operating communication link at the time of the containment event.

By setting the predetermined time period at, for example, a few milliseconds, because node 14 will indicate a fault containment by disabling its then active communication links at substantially the same time, it can be determined with reasonable assurance that the detection of the loss of one link from a fault containing node 12 to the detection of failure of another (or the last) communication link from that same node within these few milliseconds means that the node has actually experienced and isolated a fault.

Although the above-description regarding detection of communication link failure within a predetermined time period was made with reference to a router 14 communicating with another router 14, e.g., router 14a communicating with router 14b, and one of the routers 14 making the determination in step S104, the present invention is not limited to such. For example, it is contemplated that routers 14 that detect a communication link failure can transmit a message to a system controller (not shown) indicating that a particular communication link has failed. If the system controller receives indications from routers 14 showing that all links from a node 12 have failed, the system controller can, make the time period inquiry by evaluating the time of message receipt or a time stamp within the message and initiate the recovery process if the link failures have all been indicated as occurring within a predetermined time period.

The system controller or router processor can operate to set an interrupt trigger within the controller or router 14 to trigger the node recovery process. For example, this interrupt can be a signal within router 14 that causes the generation of a message to activate a backup node 12 or to send a message to a system controller to activate a backup node 12.

Of course, it is possible that a node 12 that had disabled all communication links on the bases of a perceived fault might have done so in error. Such as may be the case where, for example, a software bug results in the misinterpretation of a valid event as a fault or has caused the watchdog timer, described above, to expire such that there was in reality nothing wrong with the node 12. In such case, node 12 can automatically reactivate the disabled communication interfaces. Further, node 12 having reactivated its communication links can notify a system controller (not shown) that the fault detection was in error. Accordingly, the system controller can disable backup node 12 and reactivate and/or reinsert that restored node 12 into service.

Advantageously, because reaction to the last link from a node 14 failing and an element within node 12 failing are the same, the result is that the backup node 14 is activated. Once service is restored on the backup node 12, maintenance personnel or automated recovery software can investigate the source of the failure and perform corrective recovery actions to address the situation. For example, if the problem were simply failure of the last link from a node 12, thereby leaving node 12 with no means for communication with router 14, the maintenance action is to correct the broken link. However, if it turned out that the failure of the last link was due to node 12 disabling all of its communication interfaces to isolate a fault, testing can be performed to determine whether the node 12 has experienced a hard fault.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product that comprises all the features enabling the implementation of the methods described herein, and which, when loaded in a computing system is able to carry out these methods. Storage medium refers to any volatile or non-volatile computer readable storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. It will be appreciated by persons skilled in the art that the present invention is not limited to what has been particularly shown and described herein above. Significantly, this invention can be embodied in other specific forms without departing from the spirit or essential attributes thereof, and accordingly, reference should be had to the following claims, rather than to the foregoing specification, as indicating the scope of the invention. In addition, unless mention was made above to the contrary, it should be noted that all of the accompanying drawings are not to scale.

What is claimed is:

1. A method for identifying a fault in a network node; the method comprising:
   detecting a loss of all communication links from the network node wherein the network node has a node processor, a first node communication module in operative communication with the node processor and a watchdog timer;
   determining a time duration from the loss of a first remaining communication link to the loss of a last remaining communication link;
   establishing that the network node has contained a the fault when the time duration for the loss of the first remaining communication link to the loss of the last remaining communication link is not more than a predetermined amount of time; and
   causing the network node to reset and disable all remaining node communication modules for at least the predetermined amount of time upon expiration of the watchdog timer.

2. The method according to claim 1, wherein detecting the loss of all communication links includes detecting at least one of a loss of a carrier signal and a loss of a clock signal from all remaining communication links.

3. The method according to claim 2, further comprising setting an interrupt to trigger a node recovery process when the loss of all communication links has been detected.

4. The method according to claim 1, further comprising performing a node recovery process when the node fault containment has been established.

5. The method according to claim 1, wherein determining the time duration from the loss of the first remaining communication link to the loss of the last remaining communication link includes:
   detecting the loss of the first communication link;
   communicating with routing devices in communication with the network node to determine whether the routing devices have detected the loss of one or more remaining communication links; and
   determining the time when the routing devices detected the loss of the one or more remaining communication links.

6. The method according to claim 1, wherein determining the time duration from the loss of the first remaining communication link to the loss of the last remaining communication link includes:
   receiving at least one communication reporting the detected loss of communication with the network node based on communication link failure; and
   determining the time duration from the loss of the first remaining communication link to the loss of the last remaining communication link based on the received at least one communication.

7. The method according to claim 6, further comprising initiating a recovery process when node fault containment has been established, the recovery process including signaling a system controller to enable a back-up node.

8. A system having fast fault identification and recovery, the system comprising:
   a node having a node processor and at least one node communication module in operative communication with the node processor, the node processor operating to disable all currently operational node communication modules upon detection of an event necessitating containment within the node, the at least one node communication module being controlled by an interface driver, and wherein disabling a node communication module includes stopping the interface driver and allowing a link failure to be detected by a receiving element by detecting at least one of a loss of a clock signal and a loss of a carrier detect signal on a communication link corresponding to each node communication module; and
   at least one data communication device in communication with the node through a corresponding communication link, the at least one data communication device having:
      a data communication device communication interface; and
      a data communication device processor in operative communication with the data communication device communication interface, the communication device processor:
         detecting a loss of all communication links from the node;

determining a time duration from the loss of a first remaining communication link to the loss of a last remaining communication link; and establishing that the node has contained a fault when the time duration for the loss of the first remaining communication link to the loss of the last remaining communication link is not more than a predetermined amount of time.

9. The system according to claim 8, wherein the node further includes a watchdog timer, wherein expiration of the watchdog timer causes a containment event condition within the node.

10. The system according to claim 8, wherein the node is an advanced telecommunication architecture ("ATCA") compliant device and the communication device is a router.

11. A system having fast fault identification and recovery, the system comprising:

a node having a node processor and at least one node communication module in operative communication with the node processor; and at least one data communication device in communication with the node through a corresponding communication link, the at least one data communication device having:

a communication interface; and a processor in operative communication with the communication interface, the processor:

detecting a loss of all communication links from the node;

determining a time duration from the loss of a first remaining communication link to the loss of a last remaining communication link; and establishing that the node has contained a fault when the time duration for the loss of the first remaining communication link to the loss of the last remaining communication link is not more than a predetermined amount of time and wherein the node further includes a watchdog timer, wherein expiration of the watchdog timer causes the node to reset and disable all remaining node communication modules for at least the predetermined amount of time.

12. The system according to claim 11, wherein determining the time duration from the loss of the first remaining communication link to the loss of the last remaining communication link includes:

detecting the loss of the first remaining communication link;

communicating with routing devices in communication with the node to determine whether the routing devices have detected the loss of one or more remaining communication links; and determining the time when the routing devices detected the loss of the one or more communication links.

13. The system according to claim 11, wherein determining the time duration from the loss of the first remaining communication link to the loss of the last remaining communication link includes:

receiving at least one communication reporting the detected loss of communication with the node based on communication link failure; and determining the time duration from the loss of the first remaining communication link to the loss of the last remaining communication link based on the received at least one communication.

14. The system according to claim 11, wherein the data communication device processor further operates to set an interrupt to trigger a node recovery process when the loss of all remaining communication links has been detected.

15. The system according to claim 11, further comprising a back-up node in communication with the at least one data communication device, one of the at least one data communication devices initiating a recovery process when node fault containment has been established, the recovery process including enabling the back-up node.

* * * * *

UNITED STATES PATENT AND TRADEMARK OFFICE
CERTIFICATE OF CORRECTION

| | | |
|---|---|---|
| PATENT NO. | : 7,953,016 B2 | Page 1 of 1 |
| APPLICATION NO. | : 12/041057 | |
| DATED | : May 31, 2011 | |
| INVENTOR(S) | : Baker | |

It is certified that error appears in the above-identified patent and that said Letters Patent is hereby corrected as shown below:

In Column 9, line 63, Claim 1, delete "a"

Signed and Sealed this
Thirteenth Day of September, 2011

David J. Kappos
*Director of the United States Patent and Trademark Office*